United States Patent [19]
Hartness, III et al.

[11] Patent Number: 6,119,848
[45] Date of Patent: Sep. 19, 2000

[54] CONVEYOR MOTOR DRIVE UNIT AND CONVEYOR SYSTEM

[75] Inventors: William R. Hartness, III, Greenville, S.C.; Paul L. Horton, Metairie, La.; Mark W. Davidson, Greer, S.C.; David W. Bogle, Destrehan; John C. Hawkins, Jr., Mandeville, both of La.

[73] Assignee: Hartness International, Greenville, S.C.

[21] Appl. No.: 09/235,887

[22] Filed: Jan. 22, 1999

[51] Int. Cl.[7] .................................................. B65G 23/14
[52] U.S. Cl. ............................................................ 198/833
[58] Field of Search ............................................. 198/833

[56] References Cited

U.S. PATENT DOCUMENTS

| | | |
|---|---|---|
| 812,374 | 2/1906 | Smead . |
| 1,279,579 | 9/1918 | Perkins . |
| 1,939,315 | 12/1933 | Paulson . |
| 1,960,719 | 5/1934 | Stibbs . |
| 2,150,610 | 3/1939 | Raffetto . |
| 2,386,558 | 10/1945 | Kleintop .................................. 198/883 |
| 2,405,530 | 8/1946 | Sullivan . |
| 2,446,890 | 8/1948 | Stadelman . |
| 2,609,086 | 9/1952 | McBride et al. . |
| 2,868,356 | 1/1959 | Haaff . |
| 3,033,353 | 5/1962 | Burnett et al. . |
| 3,270,863 | 9/1966 | Ackles . |
| 3,416,645 | 12/1968 | Jones . |
| 3,666,085 | 5/1972 | Folkes . |
| 3,682,295 | 8/1972 | Roinestad . |
| 3,797,635 | 3/1974 | Boisen et al. . |
| 3,858,473 | 1/1975 | Bystron . |
| 3,934,708 | 1/1976 | Kambara . |
| 4,058,204 | 11/1977 | Arieh . |
| 4,082,173 | 4/1978 | Simon-Kochloffel . |
| 4,201,286 | 5/1980 | Meier . |
| 4,413,724 | 11/1983 | Fellner . |
| 4,549,647 | 10/1985 | Cossé . |
| 4,718,656 | 1/1988 | Reist . |
| 4,863,010 | 9/1989 | Proksa et al. . |
| 5,174,437 | 12/1992 | Burger . |
| 5,303,817 | 4/1994 | Kissee . |
| 5,413,213 | 5/1995 | Golz et al. . |
| 5,490,589 | 2/1996 | Golz et al. . |
| 5,911,305 | 6/1999 | Layne . |

FOREIGN PATENT DOCUMENTS

| | | |
|---|---|---|
| 259650A3 | 3/1988 | European Pat. Off. . |
| 635414A1 | 1/1995 | European Pat. Off. . |
| 1262886 | 12/1964 | Germany . |
| 2307728 | 8/1974 | Germany . |
| 2618905 | 11/1977 | Germany . |

OTHER PUBLICATIONS

International Search Report Dated May 12, 2000 for International Application No. PCT/US99/24488 Filed on Oct. 27, 1999.

*Primary Examiner*—Christopher P. Ellis
*Assistant Examiner*—Joe Dillon, Jr.
*Attorney, Agent, or Firm*—Dority&Manning, P.A.

[57] ABSTRACT

A conveyor drive unit is provided for engaging and driving a belt type conveyor. The unit includes a motor drive unit and drive chain assembly having a drive chain driven by the motor along a drive path. The drive chain has drive lugs configured thereon to engage with drive dogs on the conveyor as the drive chain is driven along the drive path. The drive path defines the drive angle with respect to a straight path of the conveyor along the drive path. An adjustable positioning device is disposed relative to the drive chain assembly such that upon variable positioning of the drive chain assembly, the drive angle defined between the drive path of the chain and the straight path of the conveyor along the drive path varies. In this manner, the degree of engagement of the drive lugs with the drive dogs of the conveyor along the drive path can be adjusted by varying the drive angle.

25 Claims, 4 Drawing Sheets

CONVEYOR MOTOR DRIVE UNIT AND CONVEYOR SYSTEM

BACKGROUND OF THE INVENTION

The present invention relates to a drive apparatus for a conveyor system, particularly a belt conveying system used for transferring articles from one location to another.

Conveying systems are well known in the art and have any number of uses and applications. Typical conveying systems utilize a flat conveying belt, generally formed of interconnected links, driven by motors that engage with the conveyor belt. With typical systems, the motor will drive a toothed drive sprocket that engages with complimenting driving recesses or dogs formed on the conveyor belt. These drive units can be disposed in any number along the length of the conveyor belt.

Especially with plastic conveyor belts, it is important to apply the drive load over at least several adjacent links or rows of the conveyor belt to minimize the stresses placed on any individual link or section of the belt. Due to the relative play and elongation properties of the links, particularly with plastic belts, in order to distribute the driving load over several links or rows of the belt, the driving or cam members that engage the belt must "appear" to change in spacing or pitch to accommodate the movement of the individual rows or links of the belt. This happens automatically with conventional sprocket drives due to the fact that the apparent spacing or pitch between he sprocket drive members or cams along the horizontal or conveying direction of the belt changes as the sprocket rotates. However, conventional sprocket drives are not useful in all applications, particularly where the motor drive is disposed at a location intermediate of the turn around points of the conveyor belt and the belt does not wrap around the drive sprocket.

SUMMARY OF THE INVENTION

The present invention relates to an improved motor drive unit, and conveyor system incorporating the motor drive unit, wherein the driving load is distributed over several rows or links of the conveyor belt. Accordingly, it is a principal object of the present invention to provide an improved motor drive unit or apparatus for use with a conveying system.

It is a further object of the present invention to provide a conveying system particularly adapted for the improved motor drive apparatus according to the invention.

Still a further object of the present invention is to provide an improved motor drive apparatus that is capable of distributing the driving load over adjacent rows or links of a conveying belt anywhere along the conveying path of the belt.

And yet another object of the present invention is to provide an improved motor drive apparatus for use with any manner of conveying system in any conventional application of the conveying system.

Additional objects and advantages of the invention will be set forth in part in the following description, or may be obvious from the description, or may be learned through practice of the invention.

In accordance with the objects and purposes of the invention, a conveyor drive unit is provided for engaging and driving a belt-type conveyor. It should be appreciated that the conveyor drive unit can be used with any conventional belt conveyor. In a preferred embodiment, the belt conveyor is a conventional belt formed by interlocking plastic, or other suitable materials, links that define a generally flat conveying surface.

The conveyor drive unit according to the invention includes a motor drive that may incorporate any conventional motor. A drive chain assembly is provided having a drive chain driven by the motor along a drive path. The drive chain assembly may include any number and configuration of drive sprockets, idler sprockets, tensioning sprockets, tensioning rollers, etc. The drive chain includes drive lugs configured thereon to engage with complimenting drive dogs configured on the conveyor as the drive chain is driven along the drive path. The drive path defines a drive angle with respect to a straight path of the conveyor along the drive path.

An adjustable positioning device is disposed relative to the drive chain assembly wherein upon variable positioning of the device, the drive chain assembly is adjusted and the drive angle correspondingly varies. In this manner, the degree of engagement of the drive lugs with the drive dogs of the conveyor along the drive path can be adjusted by varying the drive angle.

In one preferred embodiment, the conveyor drive unit includes support structure. The drive chain assembly, positioning device, and other components of the drive unit may be mounted on the support structure. In a preferred arrangement, a carriage is movably mounted on the support structure and the drive chain assembly includes drive and idler sprockets mounted on the carriage. The positioning device is mounted on the support structure and engages with the carriage to vary the drive angle by changing position of the carriage. In this embodiment, the drive path is preferably defined between the drive and idler sprockets. The carriage may be pivotally mounted on the support structure at a pivot point, with the positioning device engaging the carriage generally opposite from the pivot point.

In a preferred embodiment wherein the drive chain assembly includes an idler sprocket and a drive sprocket, one of the idler or drive sprockets is displaceable or movable relative to the other sprocket so as to vary or change the drive path of the drive chain which is defined between the idler and drive sprockets. For example, the idler sprocket may be mounted on a movable carriage, with the positioning device in engagement with the carriage to change the drive angle by changing the relative position of the idler sprocket relative to the stationary drive sprocket.

The positioning device may comprise any manner of device, including a manually adjustable mechanism, for example a simple screw type mechanism. Alternatively, the positioning device can comprise any manner of automatic or power device, including electric, hydraulic, or pneumatic engaging devices.

In a preferred arrangement, the drive chain assembly includes drive and idler sprockets that are disposed in a generally horizontal plane with the drive path defined between the drive and idler sprockets. In this arrangement, the conveyor drive unit is generally disposed beneath the conveyor to engage the drive dogs on the conveyor from below along the drive path of the drive chain.

The present invention also encompasses a conveyor system utilizing the conveyor drive unit assembly as described above. For example, the invention may include a belt conveyor having spaced apart drive dogs configured on a bottom surface thereof. Any manner of conventional belt conveyor may be utilized in this regard, including conventional plastic link belt conveyors. The conveyor drive unit is disposed relative to the conveyor so as to engage the drive dogs and move the conveyor in a desired direction. The conveyor drive unit may include any of the embodiments described herein as well as various modifications thereof.

DETAILED DESCRIPTION OF THE PREFERRED EMBODIMENTS

Figure 1:
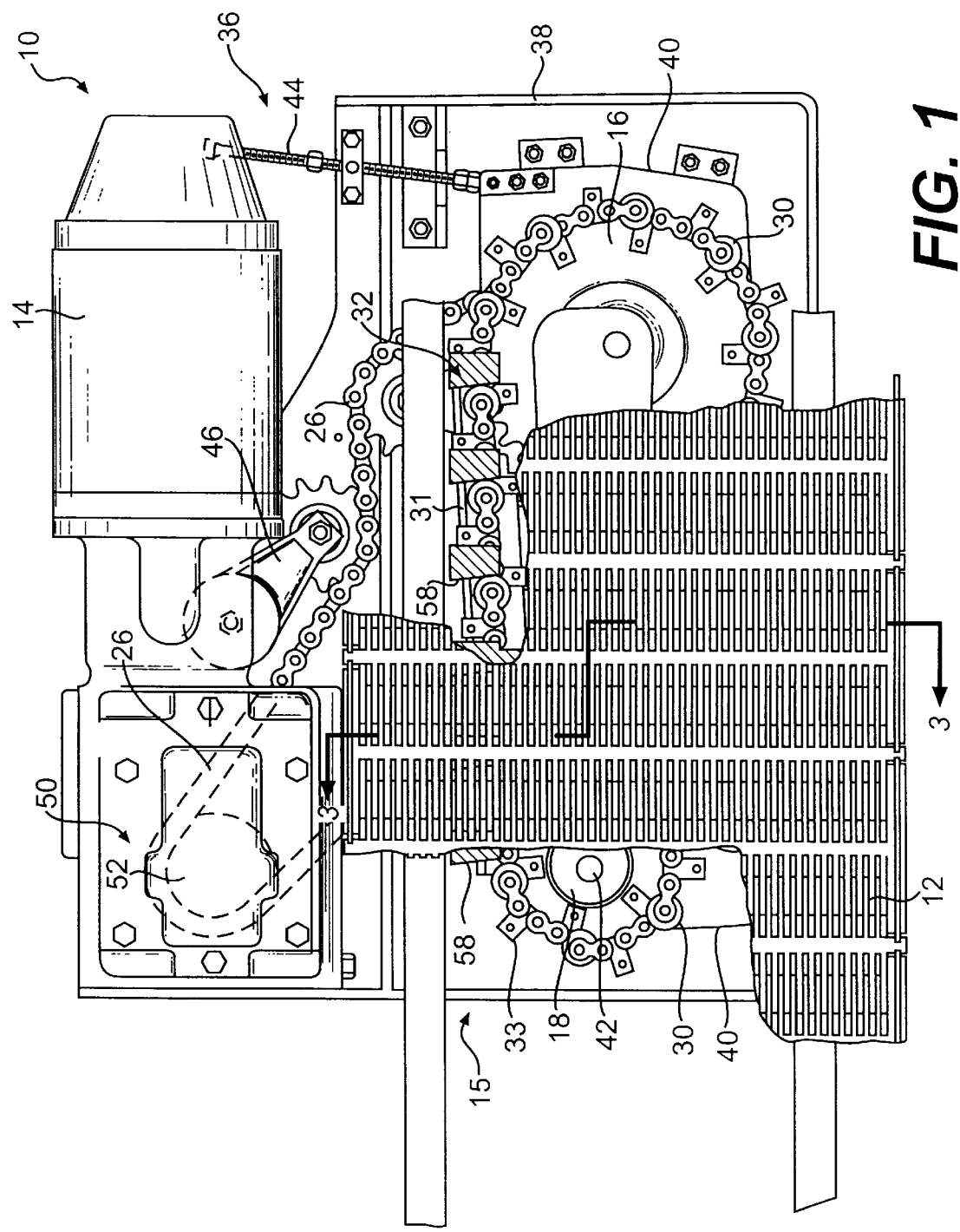
FIG. 1 is a perspective and partial cut away view showing an embodiment of the conveyor drive unit and conveyor according to the invention.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment may be used with another embodiment to yield still a further embodiment. It is intended that the present invention include such modifications and variations as come within the scope and spirit of the invention.

The present invention relates generally to a conveyor drive unit for any manner of conventional conveyor belt, particularly plastic belts made from modules or links having drive dogs thereon for being engaged by drive lugs or rollers on a driven chain. A premise of the present invention is that superior driving results can be achieved by angling the path of the drive chain relative to a straight conveying path of the conveyor, and also by angling the drive surfaces of the conveyor belt drive dogs. As is commonly understood in the art, the pitch of conventional conveyor belts tends to vary under load and over time (i.e., the belt collapses and expands with load variations and tends to expand over time). It is difficult to drive such conventional belts effectively with a fixed pitch drive chain running in the same direction as the conveyor belt with drive surfaces transverse to the direction of belt travel, as is conventionally done. As described above in the background section, in such a conventional scheme, one drive surface typically carries all of the load without sharing the load among other drive surfaces, particularly along the drive path of the chain wherein a plurality of drive lugs of the chain are engaged with the conveyor belt. This results in early belt failure and a relatively "rough" conveying of the belt due to the loaded engagement and disengagement of the drive lugs and drive dogs.

Theoretically, the problems with such conventional drive units may be compensated for by varying the pitch of the drive chain to accommodate for the changes in pitch of the conveyor belt links. However, it is practically impossible to physically change the pitch of the drive chain, which is conventionally made out of a steel chain. The present invention provides a unique solution.

Figure 4A:
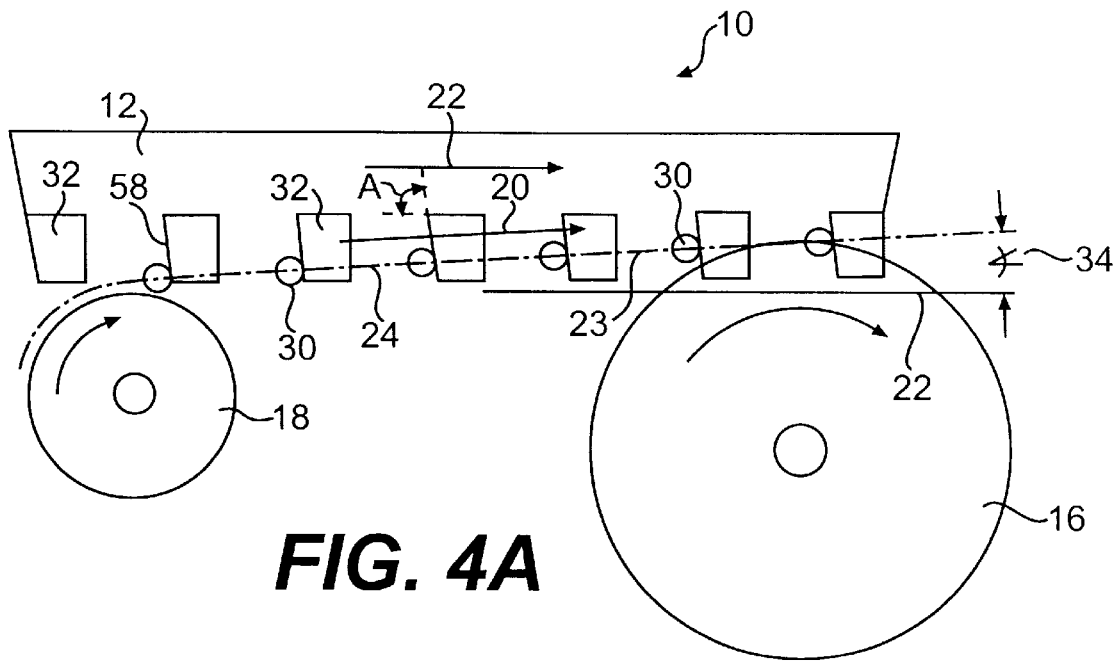
FIGS. 4A and 4B are diagrammatic operational views particularly illustrating the relationship between the angled drive path and conveyor path.
Figure 4B:
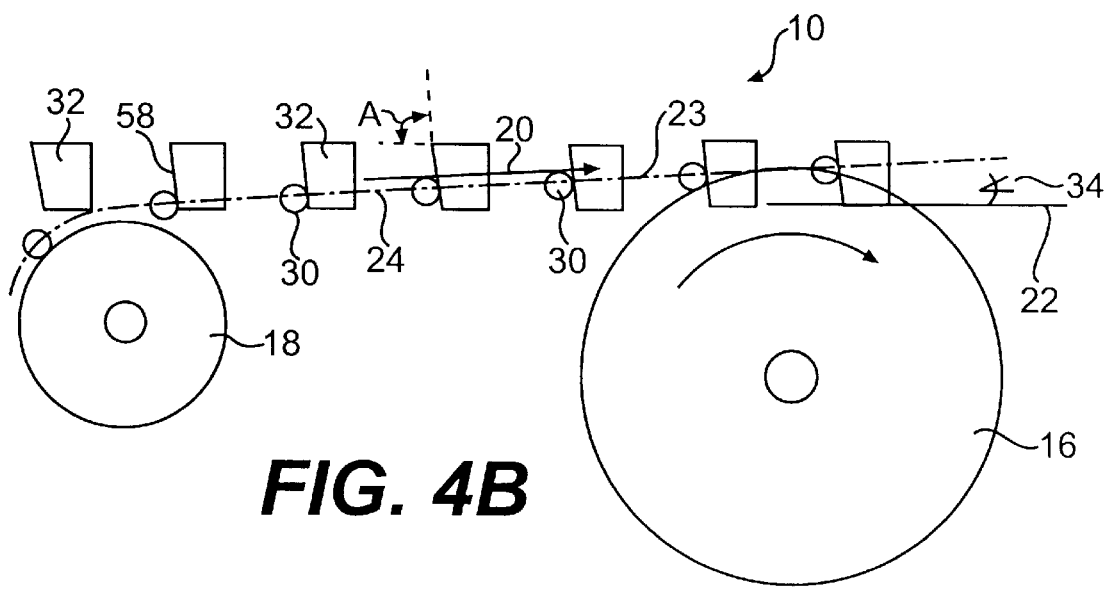

The invention will first be described with regards to the diagrammatical representations of FIGS. 4A and 4B. Any conventional conveyor belt is illustrated as belt 12 having drive dogs 32 disposed thereon, for example on a bottom surface of belt 12. Drive dogs 32 have a drive face 58 defined thereon. Typically, drive dogs 32 are defined on alternate or spaced apart interconnected links of conveyor belt 12. There is an inherent degree of "play" between the links, which also contributes to change in pitch between drive dogs 32. Conveyor 12 is driven in a generally straight conveyor path indicated by arrow 22.

The conveyor drive unit according to the invention is generally illustrated as reference numeral 10. The particular mechanisms and structure of unit 10 will be described in greater detail below. However, for sake of the diagrammatic explanation, conveyor unit 10 includes a driven drive chain 24 having a plurality of spaced apart drive lugs 30 disposed thereon. Lugs 30 may comprise drive rollers 54 (FIG. 3) for engaging drive dogs 32 and moving conveyor 12 in its conveying direction. Conveying chain 24 engages with conveying belt 12 along a drive path. For example, the drive path may be defined between an idler sprocket 18 and a drive sprocket 16. The actual drive path is indicated by the dashed line 23 in FIGS. 4A and 4B, and also by arrow 20. Drive path 23 defines an angle 34 with respect to the conveyor belt path 22. Drive angle 34 is adjustable, as described in greater detail below, between 0° and an angle less than 90°. As can be particularly seen in FIGS. 4A and 4B, drive angle 34 is such that chain 24 has an inclined "angle of attack" with respect to drive dogs 32. For example, drive lugs 30 engage against drive faces 58 at a relatively bottommost point as drive lugs 30 come off of idler sprocket 18 and move towards drive sprocket 16. As the individual drive lugs 30 move in the conveying direction, the lugs move up on drive faces 58. Due to this change in the vertical component caused by drive angle 34, the effective pitch or horizontal spacing of the drive lugs 30 varies along the drive path 20. Applicants have found that this arrangement causes a greater number of drive lugs 30 to remain in driving engagement with drive dogs 32 along the length of drive path 20, and allows for a smooth and vibration reducing engagement and release between drive lugs 30 and drive dogs 32.

Applicants have also found that the effect of the angled drive path 20 is enhanced if drive faces 58 on drive dogs 32 are also angled (non-perpendicular) with respect to a flat or horizontal bottom surface of conveyor belt 12. This angle is indicated as reference character A in FIGS. 4A and 4B where it can be seen that drive faces 58 are angled in the conveying direction of the conveyor. Because of this angle of the drive faces, as the drive lugs 30 move up drive dogs 32 along drive path 20, they are forced into further engagement with each drive dog 32, which further accommodates for any change in spacing or pitch between the conveyor belt links.

Thus, the angle 34 of drive path 20 and the angle A of drive faces 38 contribute to effectively vary the pitch of drive chain 24 without actually physically changing or modifying drive chain 24 along the length of drive path 20. Applicants have found that a useful angle configuration is to have the angle of drive faces 58 equal to the maximum angle of adjustability of drive path 20. For example, angle 34 may be adjustable between 0° and 6° and drive faces 58 may have an angle of 6° so that when drive angle 34 is at its maximum, drive path 20 is perpendicular to drive faces 58.

Figure 2:
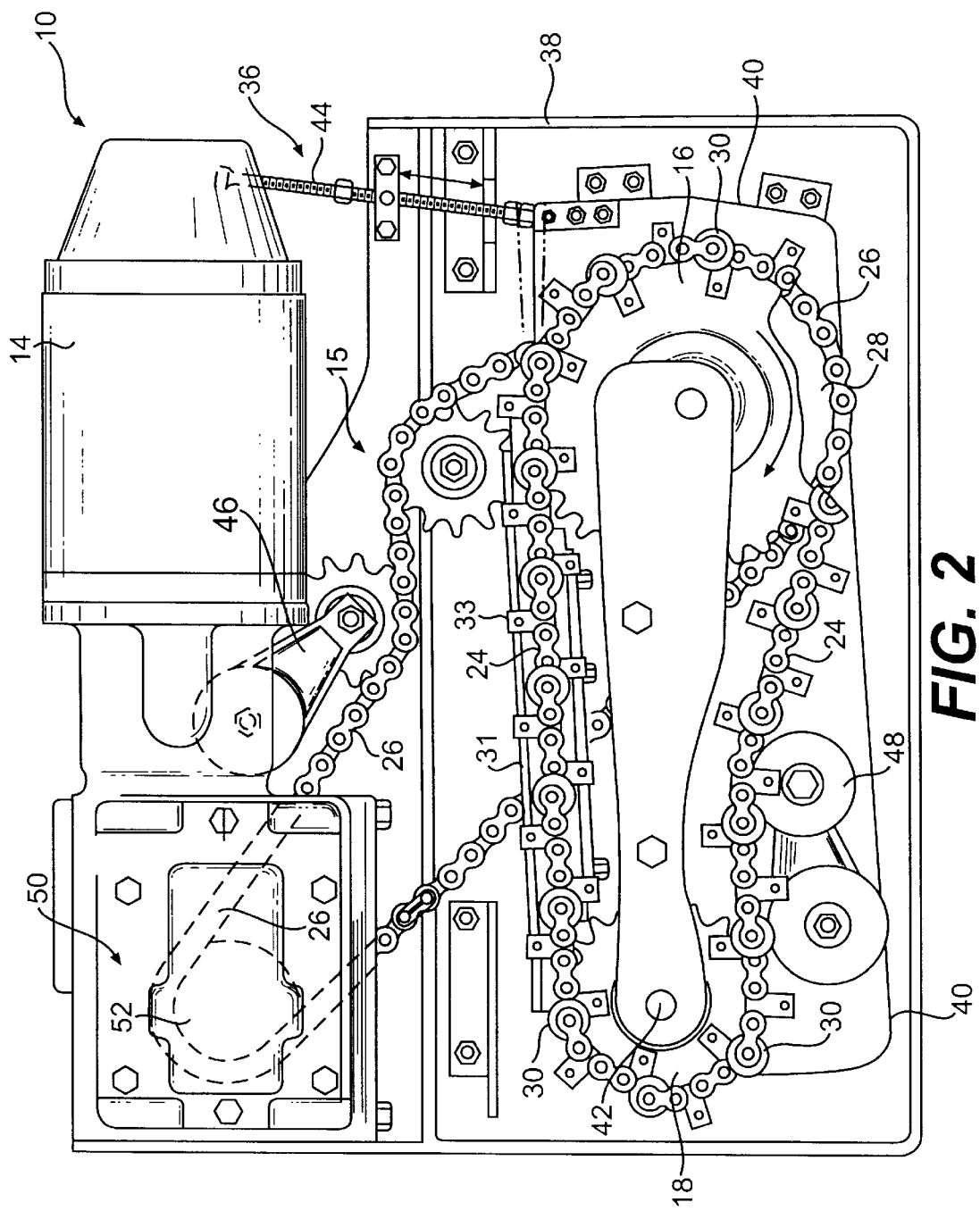
FIG. 2 is a detailed perspective view of the conveyor drive unit, and more particularly the drive chain assembly and adjustable drive path.
Figure 3:
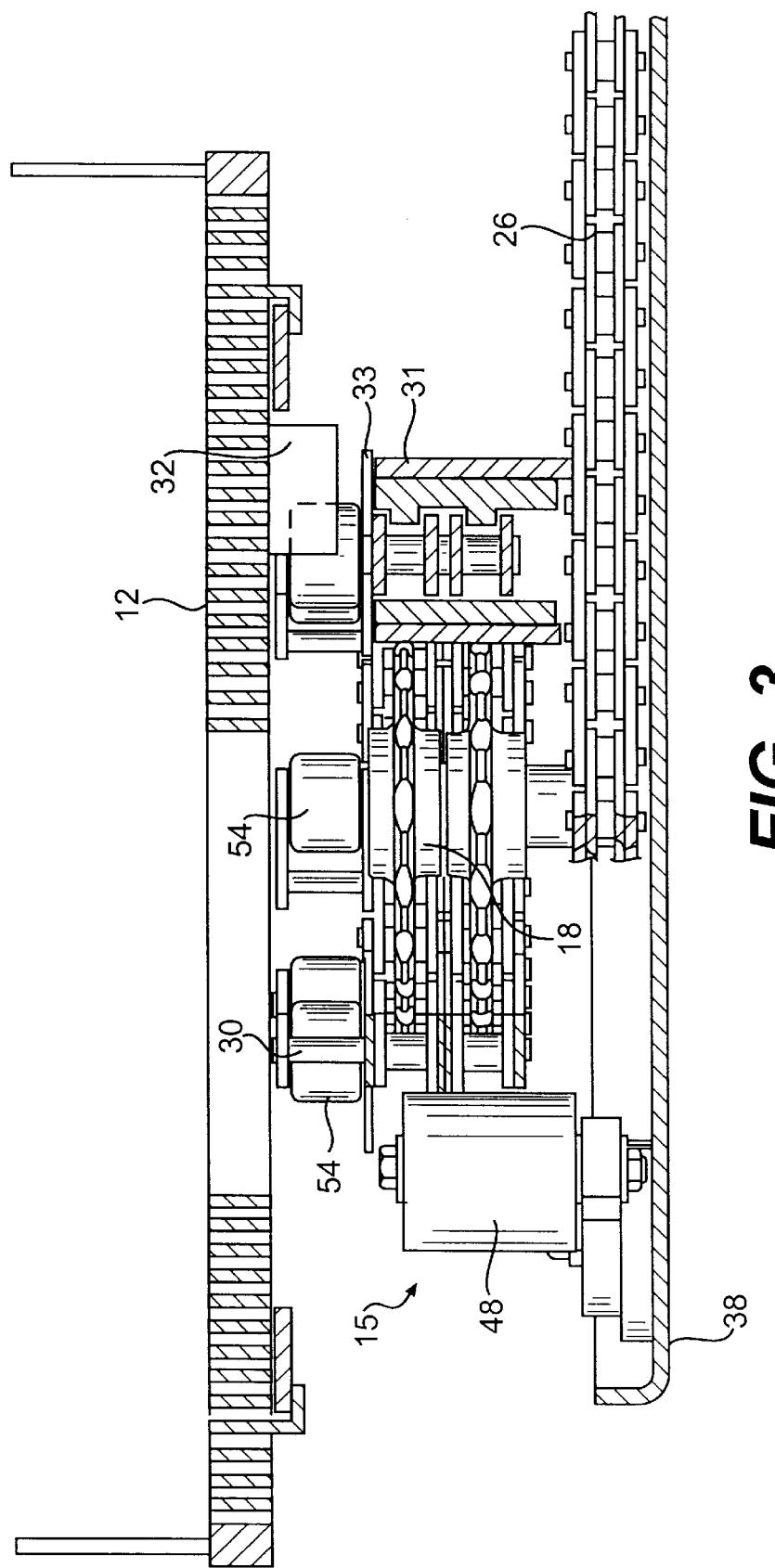
FIG. 3 is a side cut-away view taken along the lines indicated in FIG. 1.

One preferred embodiment of structure for carrying out the present invention is illustrated in FIGS. 1–3. It should be appreciated that this is but one example of suitable structure and that any number of structural modifications and variations may be incorporated in the invention.

Referring to FIGS. 1–3, conveyor drive unit 10 includes a motor drive 14, which may comprise any conventional type of drive motor, preferably a conventional electric motor. A drive chain assembly, generally 15, having a drive chain 24 is configured with motor 14 so that drive chain 24 is driven along the conveying path. In a preferred embodiment, drive chain assembly 15 includes any arrangement of drive and idler sprockets disposed so as to define the drive path as discussed above. In the embodiment illustrated, drive chain assembly 15 includes an idler sprocket 18 spaced apart from a drive sprocket 16. A motor chain 26 is disposed around a primary drive 52 that is coupled to motor 14 through any conventional gearing arrangement. Motor chain 26 directly drives a sprocket 28. A tensioning sprocket 46 may be provided on motor chain 26. A drive sprocket 16 is mounted for rotation with sprocket 28. For example, drive sprocket 16 may be mounted on a common axle with sprocket 28. In the embodiment illustrated, drive sprocket 16 and idler sprocket 18 comprise double or stacked sprockets.

Drive chain 24 is disposed around drive sprocket 16 and idler sprocket 18. A tensioning roller 48 may be provided to supply and maintain an appropriate tension on drive chain 24.

Drive chain 24 is driven along drive path 20 that is defined generally by rails 31. Drive chain 24 includes support tabs 33 that extend generally transversely from drive chain 24 and which ride upon rails 31 along drive path 20.

Drive chain 24 also includes spaced apart drive lugs 30 for engagement with drive dogs 32 on the conveyor, as described above. Drive lugs 30 may take on any conventional configuration, but are preferably drive rollers 54 as particularly illustrated in FIG. 3. The pitch or spacing of drive lugs 30 is essentially constant since chain 24 is a heavy duty metal or steel chain and the links are generally not susceptible to change due to load, stress, age, etc.

Conveyor drive unit 10 also includes an adjustable positioning device, generally 36, that is operationally configured or disposed relative to drive chain assembly 15 so as to change or re-position some component thereof causing drive angle 34 between drive path 20 and the generally straight conveying path of conveyor 12 to vary. It should be appreciated that there are any number of ways to change this drive angle. For example, the relative position between either of the idler or drive sprockets 18, 16 could be changed relative to the other resulting in a change in the drive angle. In the preferred embodiment illustrated in the figures, conveyor drive unit 10 includes support structure 38 having the components mounted thereon. Support structure 38 can comprise any manner of framing or support devices. A movable carriage 40 is mounted on structure 38. Carriage 40 may be movable in a plane such that drive angle 34 is varied. For example, in the embodiment illustrated, carriage 40 is pivotally mounted relative to a pivot point 42 that also coincides with the axle of idler sprocket 18. Positioning device 36 engages carriage 40 to pivot or move the carriage causing the relative position of drive sprocket 16 to change relative to idler sprocket 18. It should be appreciated that the reverse configuration is just as feasible.

The adjustable positioning device 36 is illustrated in the figures as a simple mechanical screw type of device wherein a bolt or screw 44 is engaged with carriage 40 such that manual adjustment of screw 44 causes carriage 40 to pivot or change position. Any manner of well-known engaging or moving members may be utilized, for example, a solenoid type device, hydraulic device, pneumatic device (all of which may be automatically adjustable) and are within the scope of the invention.

It should be appreciated by those skilled in the art that various modifications and variations can be made in the present invention without departing from the scope and spirit of the invention. For example, any configuration of the drive and idler sprockets configured with any conventional drive unit may be utilized to provide a variably positionable drive path in order to realize the benefits of the invention. All such configurations are considered as part of the present invention as come within the scope and spirit of the invention.

What is claimed is:

1. A conveyor drive unit for engaging and driving a belt-type conveyor, said drive unit comprising:
   a motor drive;
   a drive chain assembly having a drive chain driven by said drive motor in a direction defining a drive path, said drive chain comprising drive lugs thereon oriented so as to engage complimenting drive dogs configured on the conveyor as said drive downwardly depending chain is driven along said drive path, said drive path defining a drive angle with respect to a straight path of the conveyor along said drive path;
   an adjustable positioning device operably disposed relative to said drive chain assembly wherein upon variable positioning of said drive chain assembly, said drive angle correspondingly varies; and
   wherein the degree of engagement of said drive lugs with the drive dogs of the conveyor along said drive path can be adjusted by varying said drive angle.

2. The drive unit as in claim 1, wherein said positioning device comprises a manually adjustable mechanism.

3. The assembly as in claim 1, wherein said positioning device comprises a manually adjustable mechanism.

4. The drive unit as in claim 1, wherein said drive chain assembly includes an idler sprocket positionable relative to a drive sprocket to change said drive angle.

5. The drive unit as in claim 4, wherein said idler sprocket is mounted on a movable carriage, said positioning device in engagement with said carriage to change said drive angle.

6. The drive unit as in claim 1, wherein said drive chain assembly includes drive and idler sprockets disposed in a generally horizontal plane, said drive path defined between said drive and idler sprockets.

7. The drive unit as in claim 1, wherein said drive lugs comprise rollers disposed on said drive chain.

8. The drive unit as in claim 1, further comprising a support structure, said drive chain assembly and said positioning device mounted on said support structure.

9. The drive unit as in claim 8, further comprising a carriage movably mounted on said support structure, said drive chain assembly further comprising drive and idler sprockets mounted on said carriage with said positioning device engaging said carriage to vary said drive angle by changing position of said carriage, said drive path defined between said drive and idler sprockets.

10. The drive unit as in claim 9, wherein said carriage is pivotally mounted on said support structure at a pivot point, said positioning device engaging said carriage generally opposite from said pivot point.

11. A conveyor and drive unit assembly, comprising:
   a belt conveyor, said conveyor having spaced apart drive dogs configured on a bottom surface thereof;
   a motor drive unit disposed relative to said conveyor so as to engage said drive dogs and move said conveyor in the desired direction, said motor drive downwardly depending unit further comprising
   a motor drive;
   a drive chain assembly having a drive chain driven by said drive motor in a direction defining a drive path, said drive chain comprising drive lugs thereon oriented so as to engage complimenting drive dogs configured on a conveyor as said drive chain is driven along said drive path, said drive path defining a drive angle with respect to a straight path of the conveyor along said drive path;

an adjustable positioning device operably disposed relative to said drive chain assembly wherein upon variable positioning of said drive chain assembly, said drive angle correspondingly varies; and wherein the degree of engagement of said drive lugs with the drive dogs of the conveyor along said drive path can be adjusted by varying said drive angle.

12. The assembly as in claim 11, wherein said drive lugs are spaced along said drive chain at a spacing distance greater than that of said drive dogs on said conveyor.

13. The assembly as in claim 11, wherein said drive chain assembly includes an idler sprocket positionable relative to a drive sprocket to change said drive angle.

14. The assembly as in claim 13, wherein said idler sprocket is mounted on a movable carriage, said positioning device in engagement with said carriage to change said drive angle.

15. The assembly as in claim 11, wherein said drive dogs further comprise an angled drive face extending in a plane generally transverse to said drive path so as to be engaged by said drive lugs along said drive path, said drive faces defining a non-perpendicular angle with respect to a bottom surface of said conveyor.

16. The assembly as in claim 15, wherein said drive faces are angled in the direction of movement of said conveyor.

17. The assembly as in claim 15, wherein said drive faces are angled at an angle corresponding generally to a maximum angle of adjustability of said drive angle.

18. The assembly as in claim 11, further comprising a support structure, said drive chain assembly and said positioning device mounted on said support structure.

19. The assembly as in claim 18, further comprising a carriage movably mounted on said support structure, said drive chain assembly further comprising drive and idler sprockets mounted on said carriage with said positioning device engaging said carriage to vary said drive angle by changing position of said carriage, said drive path defined between said drive and idler sprockets.

20. The assembly as in claim 19, wherein said carriage is pivotally mounted on said support structure at a pivot point, said positioning device engaging said carriage generally opposite from said pivot point.

21. A conveyor drive unit for engaging and driving a belt-type conveyor, said drive unit comprising:

a motor, said motor operably connected to a drive sprocket;

an idler sprocket spaced from said drive sprocket, and an endless drive chain having drive lugs configured thereon running around said drive and idler sprockets, said drive chain running between said drive and idler sprockets along a drive path wherein said drive lugs engage with corresponding drive dogs of a conveyor, said drive path defining a drive angle between a line through said drive lugs and a straight path of the conveyor between the idler and drive sprockets;

a carriage movably mounted on a support structure, at least one of said idler and drive sprockets mounted on said carriage;

an adjustable positioning device operably engaged with said carriage to move said carriage on said support structure, wherein upon movement of said carriage, one of said idler and drive sprockets changes position relative to the other causing said drive angle to vary; and wherein the degree of engagement between said drive lugs and drive dogs of the conveyor along said drive path can be adjusted by varying said drive angle.

22. The drive unit as in claim 21, wherein said idler sprocket is mounted on said carriage.

23. The drive unit as in claim 11, wherein said carriage is pivotally mounted on said support structure at a pivot point, said idler sprocket mounted on said carriage essentially at said pivot point, and said positioning device engaging said carriage generally opposite from said pivot point.

24. The drive unit as in claim 10, wherein said positioning device comprises a manually adjustable mechanism.

25. The drive unit as in claim 24, wherein said manually adjustable mechanism comprises a screw device.

* * * * *